(12) United States Patent
Hattori et al.

(10) Patent No.: US 11,049,245 B2
(45) Date of Patent: Jun. 29, 2021

(54) MEDICAL IMAGE PROCESSING APPARATUS AND METHOD FOR DETERMINING AN EXTRACTED REGION OF A LIVER USING A CROSS-SECTION

(71) Applicant: CANON MEDICAL SYSTEMS CORPORATION, Otawara (JP)

(72) Inventors: Chihiro Hattori, Nasushiobara (JP); Kota Aoyagi, Nasushiobara (JP)

(73) Assignee: CANON MEDICAL SYSTEMS CORPORATION, Otawara (JP)

( * ) Notice: Subject to any disclaimer, the term of this patent is extended or adjusted under 35 U.S.C. 154(b) by 78 days.

(21) Appl. No.: 16/659,629

(22) Filed: Oct. 22, 2019

(65) Prior Publication Data
US 2020/0134818 A1 Apr. 30, 2020

(30) Foreign Application Priority Data

Oct. 25, 2018 (JP) .............................. JP2018-200839

(51) Int. Cl.
*G06T 7/00* (2017.01)
*G06T 7/62* (2017.01)
*G06T 7/11* (2017.01)

(52) U.S. Cl.
CPC .............. *G06T 7/0012* (2013.01); *G06T 7/62* (2017.01); *G06T 2207/10012* (2013.01); *G06T 2207/30056* (2013.01); *G06T 2207/30101* (2013.01)

(58) Field of Classification Search
CPC ..................... G06T 7/0012; G06T 7/62; G06T 2207/30101; G06T 2207/10012; G06T 2207/30056; G06T 2207/20132; G06T 2207/30242; G06T 2200/24; G06T 2207/10081; G06T 2207/20021; G06T 7/11

See application file for complete search history.

(56) References Cited

U.S. PATENT DOCUMENTS

| 9,155,513 B2 * | 10/2015 | Ghosh ..................... A61B 6/469 |
| 2016/0095573 A1 * | 4/2016 | Tanaka ................... A61B 8/461 |
| | | 600/443 |

(Continued)

FOREIGN PATENT DOCUMENTS

JP 2013-146422 A 8/2013

OTHER PUBLICATIONS

Yung-Nien Sun and Ming-Huwi Horng: "Assessing Liver Tissue Fibrosis with an Automatic Computer Morphometry System", May-Jun. 1997, IEEE Engineering in Medicine and Biology, pp. 66-73. (Year: 1997).*

(Continued)

*Primary Examiner* — Siamak Harandi
(74) *Attorney, Agent, or Firm* — Oblon, McClelland, Maier & Neustadt, L.L.P.

(57) ABSTRACT

In one embodiment, a medical image processing apparatus includes: processing circuitry configured to acquire three-dimensional image data including a liver of a donor, extract a region of the liver and vessels in the liver from the three-dimensional image data, and determine, in the extracted region of the liver, a cross section of the liver in such a manner that volume of the liver to be resected from the donor satisfies a predetermined matching condition of transplantation and number of vessels on the cross section becomes smaller.

13 Claims, 12 Drawing Sheets

(56) References Cited

U.S. PATENT DOCUMENTS

2017/0143427 A1* 5/2017 Grady .................... G06T 7/11
2018/0247709 A1* 8/2018 Sakamoto ............. G06T 7/0012

OTHER PUBLICATIONS

John C. Hoefs, Felix W. Wang, David L. Lilien, Barbara Walker, and Gary Kanel: "A Novel, Simple Method of Functional Spleen Volume Calculation by Liver-Spleen Scan", Aug. 1998, Department of Medicine/Gastrointestinal Division, University of California, Irvine/Medical Center. (Year: 1998).*

* cited by examiner

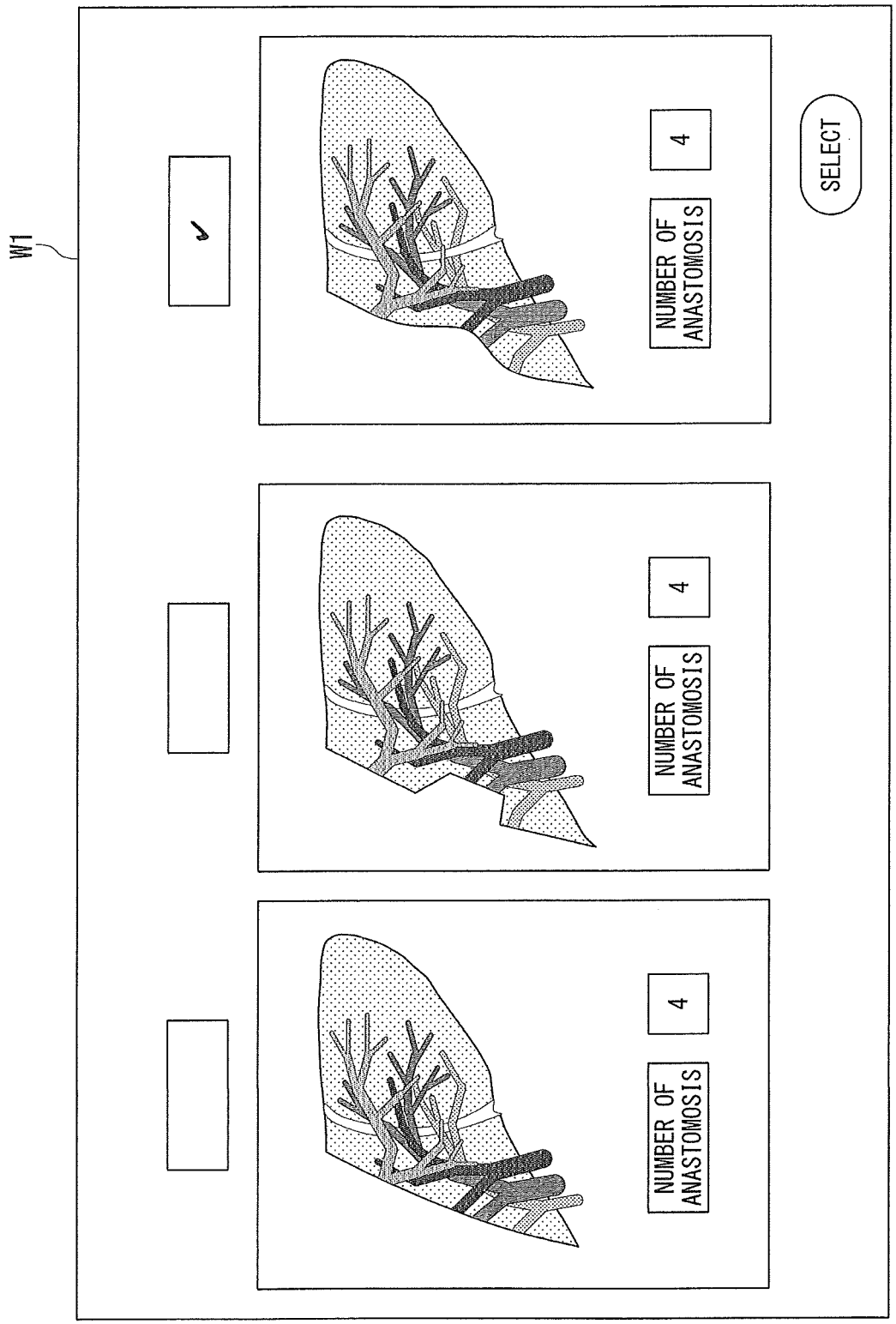

MEDICAL IMAGE PROCESSING APPARATUS AND METHOD FOR DETERMINING AN EXTRACTED REGION OF A LIVER USING A CROSS-SECTION

CROSS-REFERENCE TO RELATED APPLICATION

This application is based upon and claims the benefit of priority from Japanese Patent Application No. 2018-200839, filed on Oct. 25, 2018, the entire contents of which are incorporated herein by reference.

FIELD

Embodiments described herein relate generally to a medical image processing apparatus, a medical image processing method, and a non-transitory computer readable medium.

BACKGROUND

Living-donor liver transplantation is a transplantation method in which part of the liver of a living organ donor is resected (i.e., excised or cut out) and transplanted into the liver of a patient (i.e., recipient). The blood flow is restored by anastomosing the portal vein of the liver, which has been resected from the donor, with the portal vein on the recipient side, and thereafter, anastomosis of the hepatic artery, the hepatic vein, and the bile duct is performed.

The volume of the liver transplanted into the recipient and the volume of the liver left in the donor must be a certain amount or more. Doctors need to preoperatively examine where the liver should be resected to leave the donor with a sufficient volume of liver while transplanting the required volume of liver into the recipient.

If it takes too much time to anastomoses the vessels such as the portal vein, arteries, veins, and the bile duct, the liver after transplantation may not function. For this reason, it is necessary to minimize the time required for vascular anastomosis during the operation. Thus, doctors need to examine the position of the cross section of the liver such that the number of vessels to be anastomosed is minimized and the respective vessels are cut at positions where anastomosis is easy.

In these preoperative examinations, doctors often use slice images and three-dimensional images previously acquired by imaging donor candidates with the use of, for example, an X-ray CT apparatus. Based on the acquired slice images and three-dimensional images, doctors determine whether the candidate can actually be a donor or not, and preoperatively evaluate where in the donor's liver is best for resection.

However, conventionally, determination of the cross section of the liver has been manually performed by doctors with reference to the acquired slice images and three-dimensional images. For this reason, it takes a lot of time to preoperatively determine the cross section of the liver, and there has been a demand for shortening the time and enhancing the efficiency.

BRIEF DESCRIPTION OF THE DRAWINGS

In the accompanying drawings:

FIG. 12 is a schematic diagram illustrating a display example of a cross section in the medical image processing apparatus according to the fourth embodiment.

DETAILED DESCRIPTION

A description will now be given of embodiments of medical image processing apparatuses, medical image processing methods, and a non-transitory computer readable medium by referring to the accompanying drawings. In the following embodiments, components assigned with the same reference sign are assumed to function and operate in the same manner, and duplicate description is omitted.

In one embodiment, a medical image processing apparatus includes: processing circuitry. The processing circuitry is configured to acquire three-dimensional image data including a liver of a donor, extract a region of the liver and vessels in the liver from the three-dimensional image data, and determine, in the extracted region of the liver, a cross section of the liver in such a manner that volume of the liver to be resected from the donor satisfies a predetermined matching condition of transplantation and number of vessels on the cross section becomes smaller.

Figure 1:
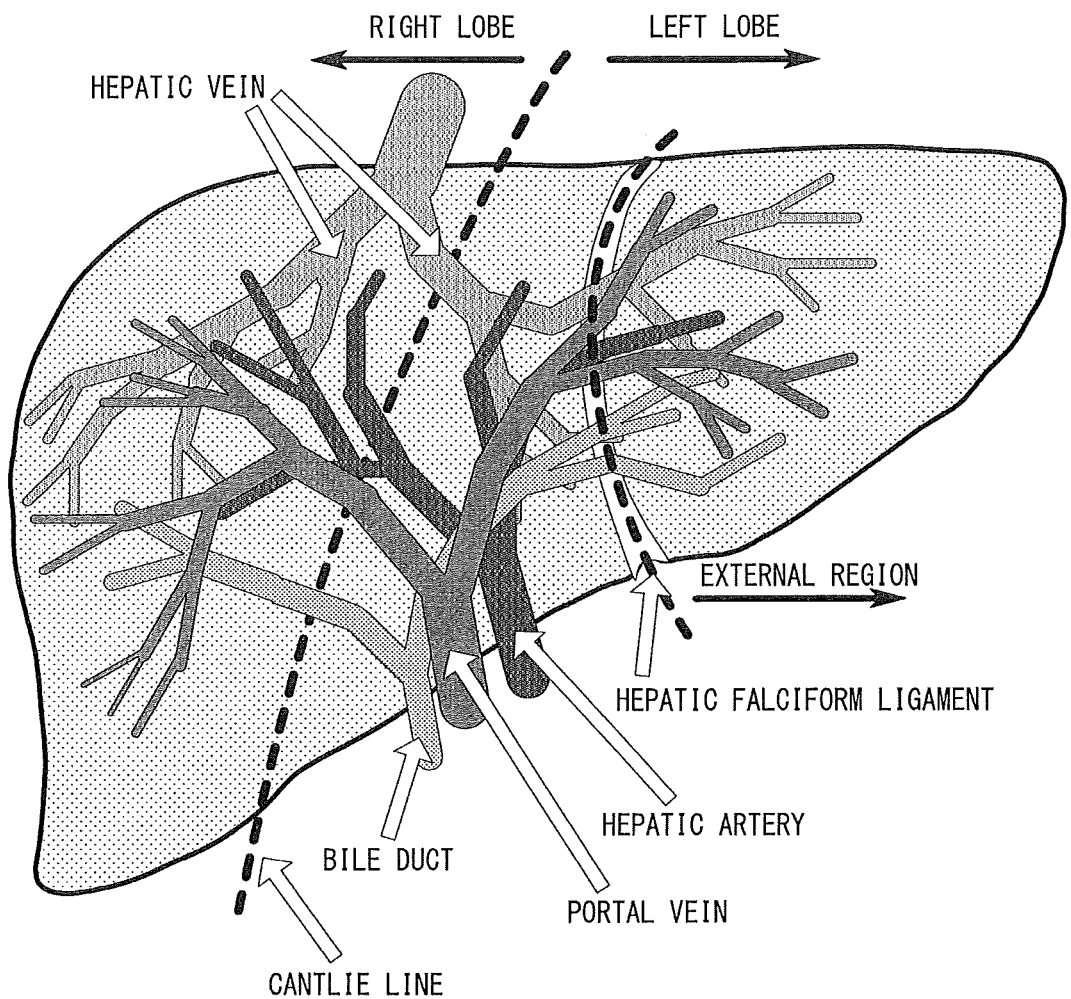
FIG. 1 is a schematic diagram illustrating the liver and the vessels flowing through the liver, such as an artery, a vein, and a bile duct.

Before describing detailed embodiments of the present invention, an outline of living-donor liver transplantation will be described. FIG. 1 is a schematic diagram illustrating a standard liver and the blood vessels flowing through the liver, such as an artery, a vein, and a bile duct. The liver is the largest organ in the abdominal cavity located under the right diaphragm, and weighs about 1200 to 1400 grams in adults.

Although the liver is anatomically divided into right and left such that the boundary between both is the cord-like structure called the hepatic falciform ligament, in actual clinical practice, the liver is generally divided into the right lobe and the left lobe such that the boundary between both is the Cantlie line. Further, the left lobe is divided into an outer area and an inner area such that the boundary between both is the hepatic falciform ligament. The Cantlie line is a line connecting the fundus of the gallbladder and the inferior vena cava in the back side of the liver.

When liver transplantation is performed on an adult recipient, the left lobe side or the right lobe side of the donor's liver is resected within a predetermined range with respect to the Cantlie line, and the resected liver segment of the donor serves as the liver graft (i.e., liver to be transplanted).

In general, it is said that the donor's liver remaining after removing the liver graft is required to be 35% or more of the entire liver before the resection. This is because if the volume of the liver after removing the liver graft becomes 35% or less of the original volume, the liver function of the donor may be hindered. Meanwhile, the volume of the liver to be transplanted is required to be 40% or more of the entire liver of the recipient (i.e., the size of the liver that the recipient is supposed to have) for safe transplantation operation. Thus, the cross section of the donor's liver must be determined in such a manner that both the volume of liver to be left in the donor and the volume of liver to be transplanted into the recipient satisfy the above-described conditions.

As mentioned above, regarding the liver graft, it is generally said that a matching condition needs to be satisfied, and the matching condition includes at least the above two conditions with respect to the remaining volume of the donor's liver and the volume of the liver to be transplanted to the recipient In the meantime, near the center of the lower surface of the liver, there is an entrance called the hepatic portal, and the main blood vessels called the portal vein and the hepatic artery entering the liver. The blood flowing into the liver from the portal vein and the hepatic artery branches innumerably so as to flow into the capillaries in the liver, and then is collected from the capillaries into the hepatic vein so as to return to the heart via the inferior vena cava. In addition, bile produced in the liver is transported through the bile duct coming out of the hepatic portal into the gallbladder on the underside of the liver.

When resecting the liver of the donor, some parts of the blood vessels in the liver are also resected. The respective resected vessels need to be anastomosed to the corresponding vessels on the recipient side when the liver graft is transplanted into the recipient. Here, "anastomosis" is one of the procedures in surgery and refers to artificially connecting blood vessels and/or nerves that are originally separated. In the present specification, it is assumed that "vessels" refers to arteries, veins, portal veins, and bile ducts that are large enough to require anastomosis, and "vessels" do not include microtubules such as capillaries.

It is said that the procedure for anastomosing the excised liver vessels with the recipient vessels must be completed within 60 minutes (ideally within 30 minutes), otherwise, the transplanted liver will not normally function. For this reason, it is necessary to minimize the number of vessels exposed on the cross section of the liver on the donor side.

From such a viewpoint, the medical image processing apparatus 1 according to each embodiment described below has a function of determining the cross section of the liver such that the liver segment left in the donor and the resected liver segment to be transplanted to the recipient satisfy the above-described conditions in volume and the number of anastomoses of the vessels is minimized. Hereinafter, embodiments of the present invention will be described by referring to the accompanying drawings.

Figure 2:
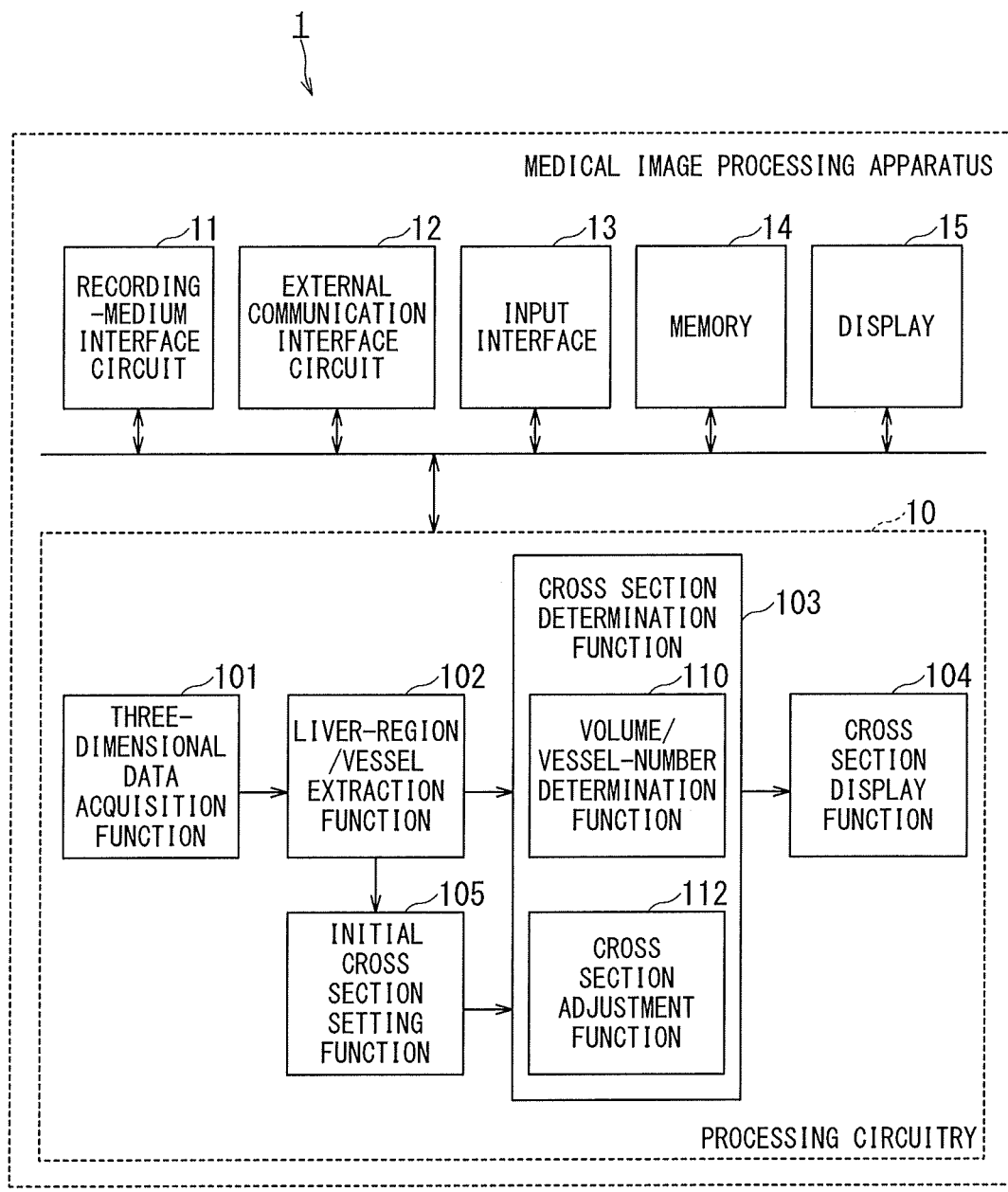
FIG. 2 is a block diagram illustrating a configuration of a medical image processing apparatus according to one embodiment.

FIG. 2 is a block diagram illustrating a configuration common to the medical image processing apparatuses 1 of each embodiment described below. The medical image processing apparatus 1 includes, for example, processing circuitry 10, a recording-medium interface circuit 11, an external communication interface circuit 12, an input device 13, a memory 14, and a display 15. The medical image processing apparatus 1 is configured as, for example, a so-called workstation or a high-performance personal computer.

The recording-medium interface circuit 11 is an interface circuit that inputs and outputs data via a recording medium such as an optical disk, a USB memory, and an SD memory card.

The external communication interface circuit 12 is an interface circuit that inputs and outputs data via a wired or wireless local network, a wide area network, the Internet, or a special-purpose or general-purpose communication line. In the medical image processing apparatus 1 of the present embodiment, three-dimensional image data including the donor's liver are inputted via the recording-medium interface circuit 11 or the external communication interface circuit 12.

The input interface 13 includes various devices for an operator to input various types of information and data, and is configured of a mouse, a keyboard, a trackball, and a touch panel, for example.

The memory 14 is a semiconductor memory including a read-only memory (ROM) and a random access memory (RAM) in addition to an external memory device such as a hard disk drive (HDD) and an optical disc device. The memory 14 stores various programs executed by a processor of the processing circuitry 10 as well as data necessary for implementing the various functions described below.

The display 15 is a display device such as a liquid crystal display panel, a plasma display panel, and an organic EL panel.

The processing circuitry 10 is a circuit that includes a central processing unit (CPU) and/or a special-purpose or general-purpose processor, for example. The processor implements various functions described below by executing the programs stored in the memory 14. The processing circuitry 10 may be configured of hardware such as an FPGA (Field Programmable Gate Array) and an ASIC (Application Specific Integrated Circuit). The various functions described below can also be implemented by such hardware. Additionally, the processing circuitry 10 can implement the various functions by combining hardware processing and software processing based on its processor and programs.

Further, the processing circuitry 10 may be configured by combining a plurality of independent processors such that the processors implement the respective functions. When the processing circuitry 10 is provided with the plurality of processors, a memory for storing the programs may be provided for each processor or one memory may collectively store all the programs corresponding to all the processors.

Figure 3:
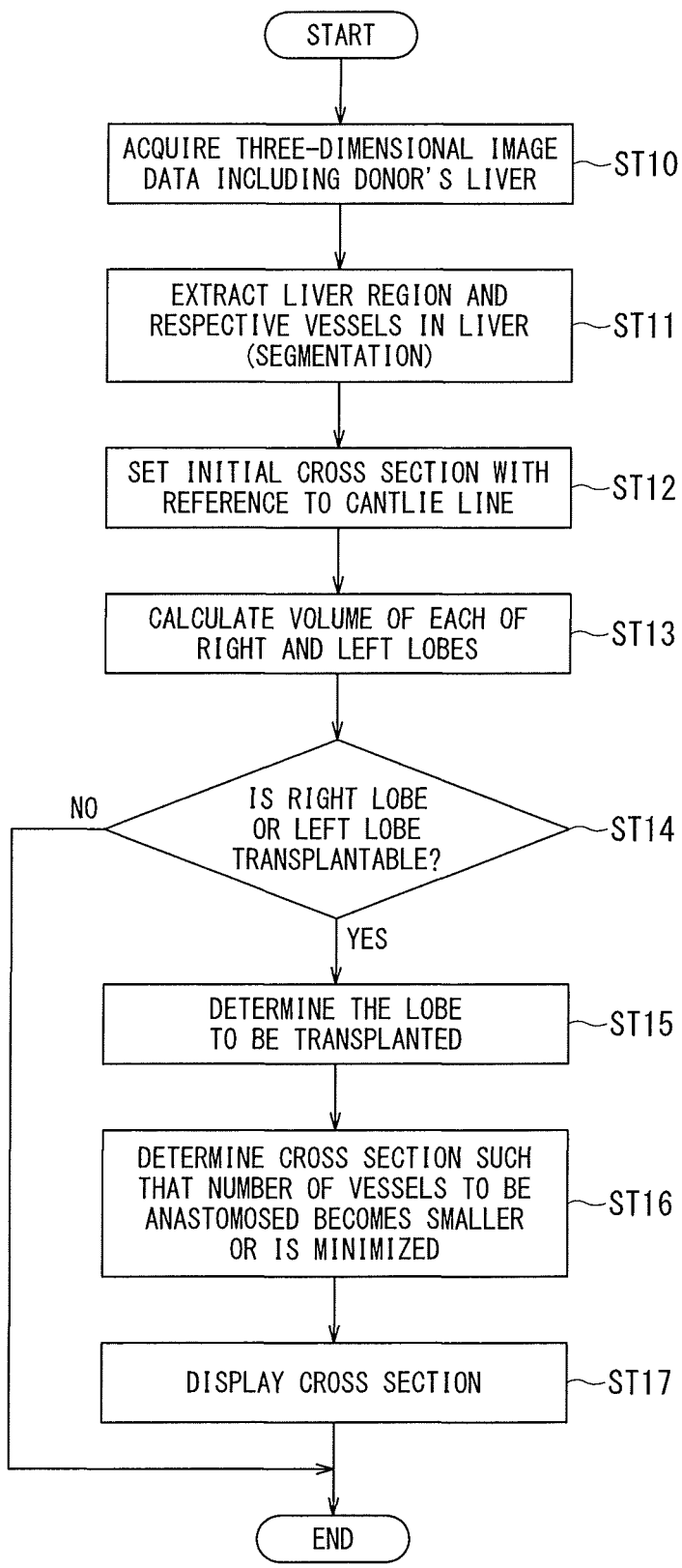
FIG. 3 is a flowchart illustrating an operation to be executed by the medical image processing apparatus according to the embodiment.

The processing circuitry 10 of each embodiment implements the respective functions shown in FIG. 2, i.e., a three-dimensional data acquisition function 101, a liver-region/vessel extraction function 102, a cross section determination function 103, a cross section display function 104, and an initial cross section setting function 105. The cross section determination function 103 has a volume/vessel-number determination function 110 and a cross section adjustment function 112. FIG. 3 is a flowchart illustrating an operation to be executed by the medical image processing apparatus 1 of each embodiment. The functions shown in FIG. 2 will be described in more detail in accordance with the step number of the flowchart of FIG. 3.

First, in the step ST10, three-dimensional image data including the donor's liver are acquired. The processing of the step ST10 corresponds to the three-dimensional data acquisition function 101. The type of three-dimensional image data is not particularly limited. For example, in the step ST10, the three-dimensional data acquisition function 101 can acquire three-dimensional image data generated by an X-ray CT apparatus, an MRI apparatus, or an ultrasonic image diagnostic apparatus.

In the step ST11, the liver region and the respective vessels in the liver are extracted from the three-dimensional image data by using, for example, a known segmentation technique. The processing of the step ST11 corresponds to the liver-region/vessel extraction function 102.

In the next step ST12, an initial cross section is set first, before an actual cross section of the liver is finally determined. The initial cross section can be set to, for example, a cross-section along the Cantlie line, although not limited to the Cantlie line. For example, a cross-section within a predetermined range from the cross-section along the Cantlie line may be selected as the initial cross section. In the case of transplanting the liver graft into a child or an infant, the hepatic falciform ligament can be set as the initial cross section and then the cross section within a predetermined range from the cross-section along the hepatic falciform ligament can be determined as the final cross section. The processing of the step ST12 corresponds to the initial cross section setting function 105.

In the next step ST13, under the assumption that the liver is resected at the initial cross section to be divided into two segments, the volume of one segment and the volume of the other segment are calculated. When the initial cross section is a cross-section along the Cantlie line, the volume of each of the right and left lobes will be calculated.

In the next step ST14, under the assumption that the liver is resected at the initial cross section into two segments, it is determined whether at least one of the two liver segments is transplantable or not. When the initial cross section is a cross-section along the Cantlie line, it is determined whether the right lobe or the left lobe is transplantable or not.

If the left lobe is transplanted into the recipient, it is determined (a) whether the volume of the left lobe is equal to or larger than a predetermined value (for example, 40% or more of the volume of the entire liver of the recipient, i.e., 40% or more of the volume of the liver that the recipient is supposed to have), and (b) whether the volume of the right lobe remaining in the donor is equal to or larger than a predetermined value (for example, 35% or more of the volume of the donor's liver before resection).

Similarly, if the right lobe is transplanted into the recipient, it is determined (a) whether the volume of the right lobe is equal to or larger than a predetermined value (for example, 40% or more of the volume of the entire liver of the recipient, i.e., 40% or more of the volume of the liver that the recipient is supposed to have), and (b) whether the volume of the left lobe remaining in the donor is equal to or larger than a predetermined value (for example, 35% or more of the volume of the donor's liver before resection).

If it is determined that at least one of the right lobe and the left lobe is transplantable, the processing proceeds to the step ST15. If it is determined neither the right lobe nor the left lobe is transplantable, the processing is completed.

In the step ST15, the lobe to be transplanted is determined. If one of the right lobe and the left lobe satisfies the above-described two conditions in the step ST14, the one satisfying the conditions is determined as the lobe to be transplanted. If both of the right lobe and the left lobe satisfy the above described two conditions, the medical image processing apparatus 1 receives the designation by a doctor and then either the right or left lobe designated by the doctor is determined as the lobe to be transplanted.

In the step next ST16, the cross section is determined, by using data of the liver region and vascular data extracted from the three-dimensional image data in the step 11, such that the number of vessels to be anastomosed is minimized or becomes as small as possible. For example, the cross section is determined such that the number of vessels to be anastomosed is decreased by adjusting at least one of the position and shape of a cross section within a predetermined range from the initial cross section. The processing of the step ST16 corresponds to the cross section determination function 103. Hereinafter, several embodiments according to the cross section determination processing in the step ST16 will be described.

First Embodiment

Figure 4:
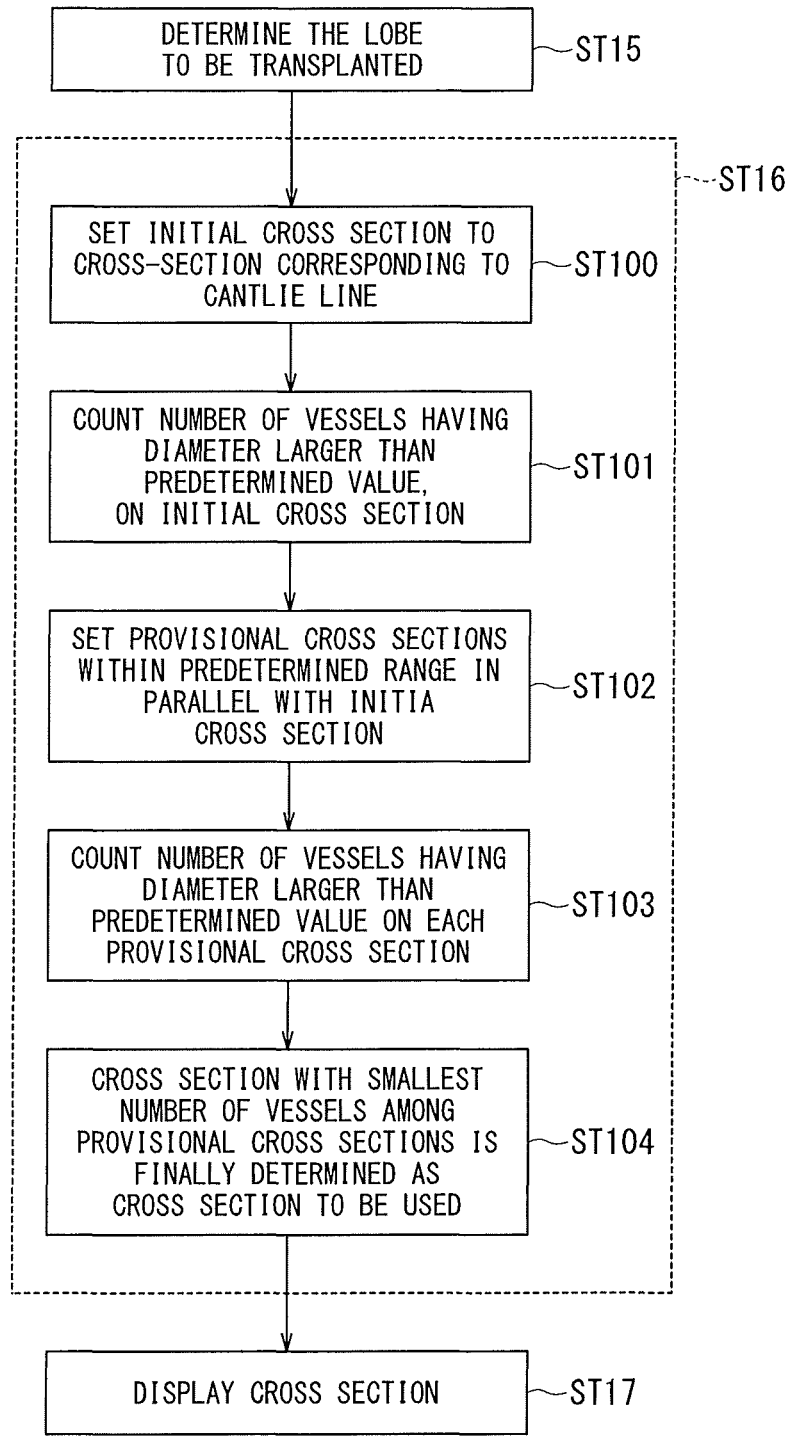
FIG. 4 is a flowchart illustrating cross section determination processing according to the first embodiment.
Figure 5:
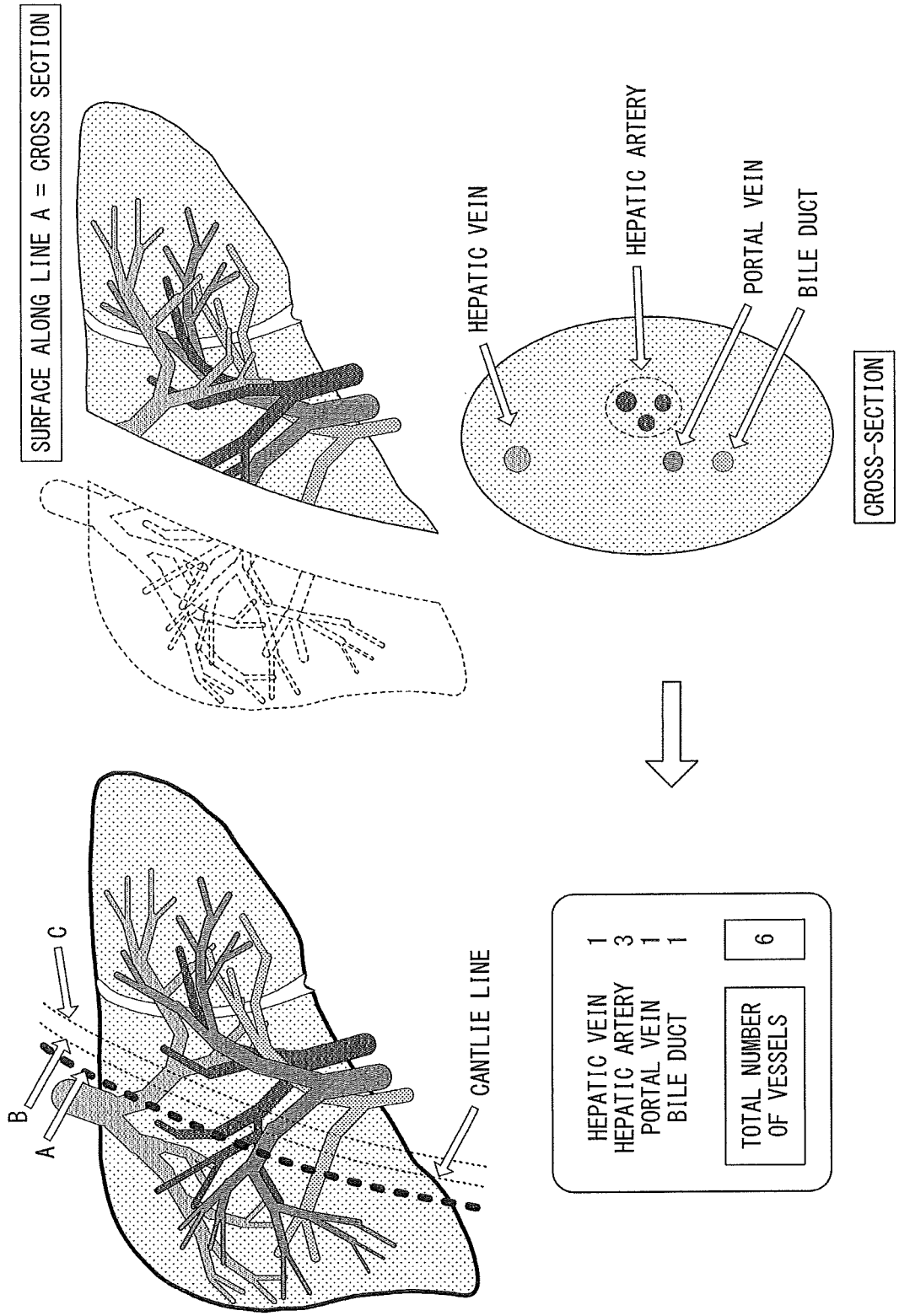
FIG. 5 is a first schematic diagram illustrating the concept of the cross section determination processing according to the first embodiment.
Figure 6:
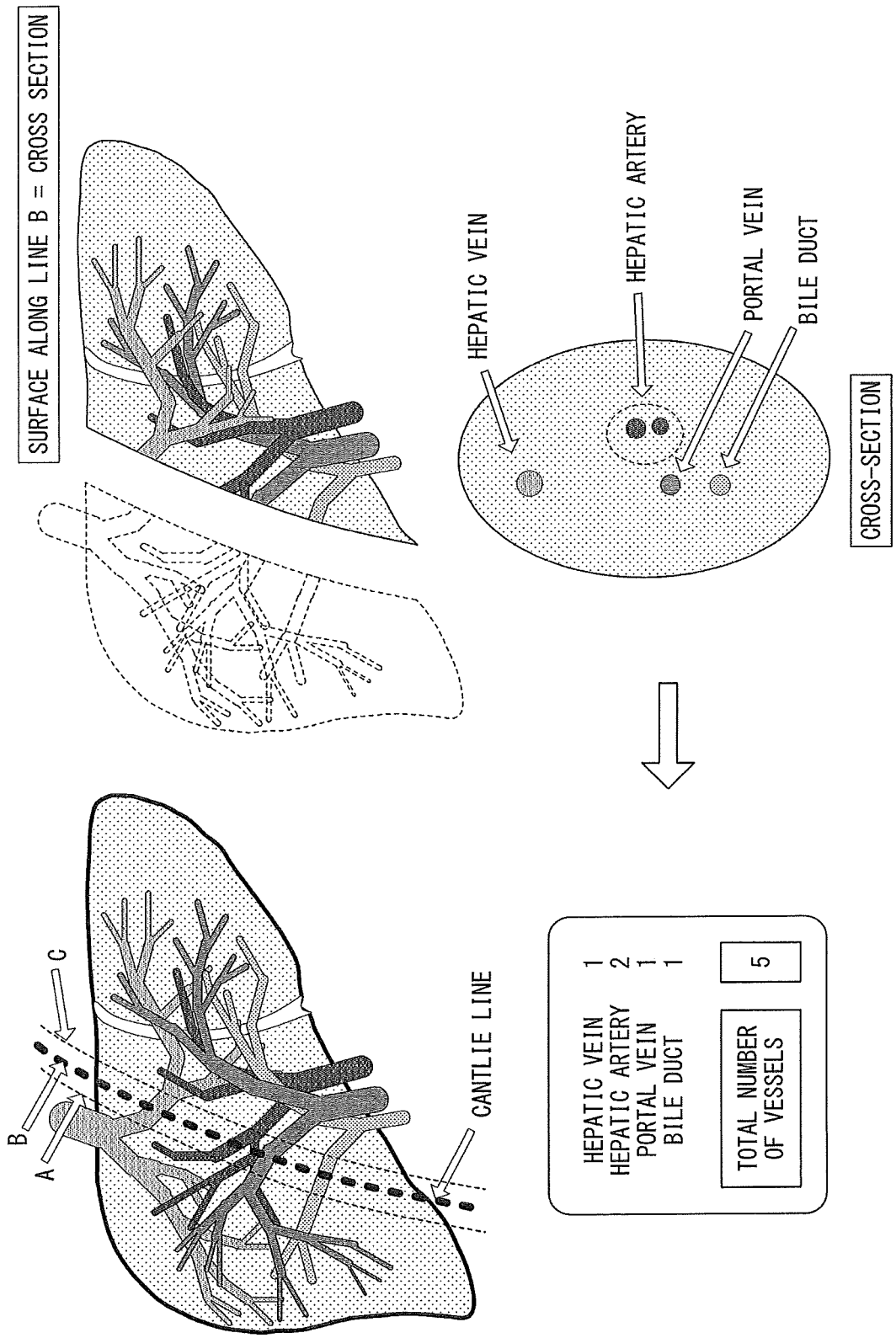
FIG. 6 is a second schematic diagram illustrating the concept of the cross section determination processing according to the first embodiment.
Figure 7:
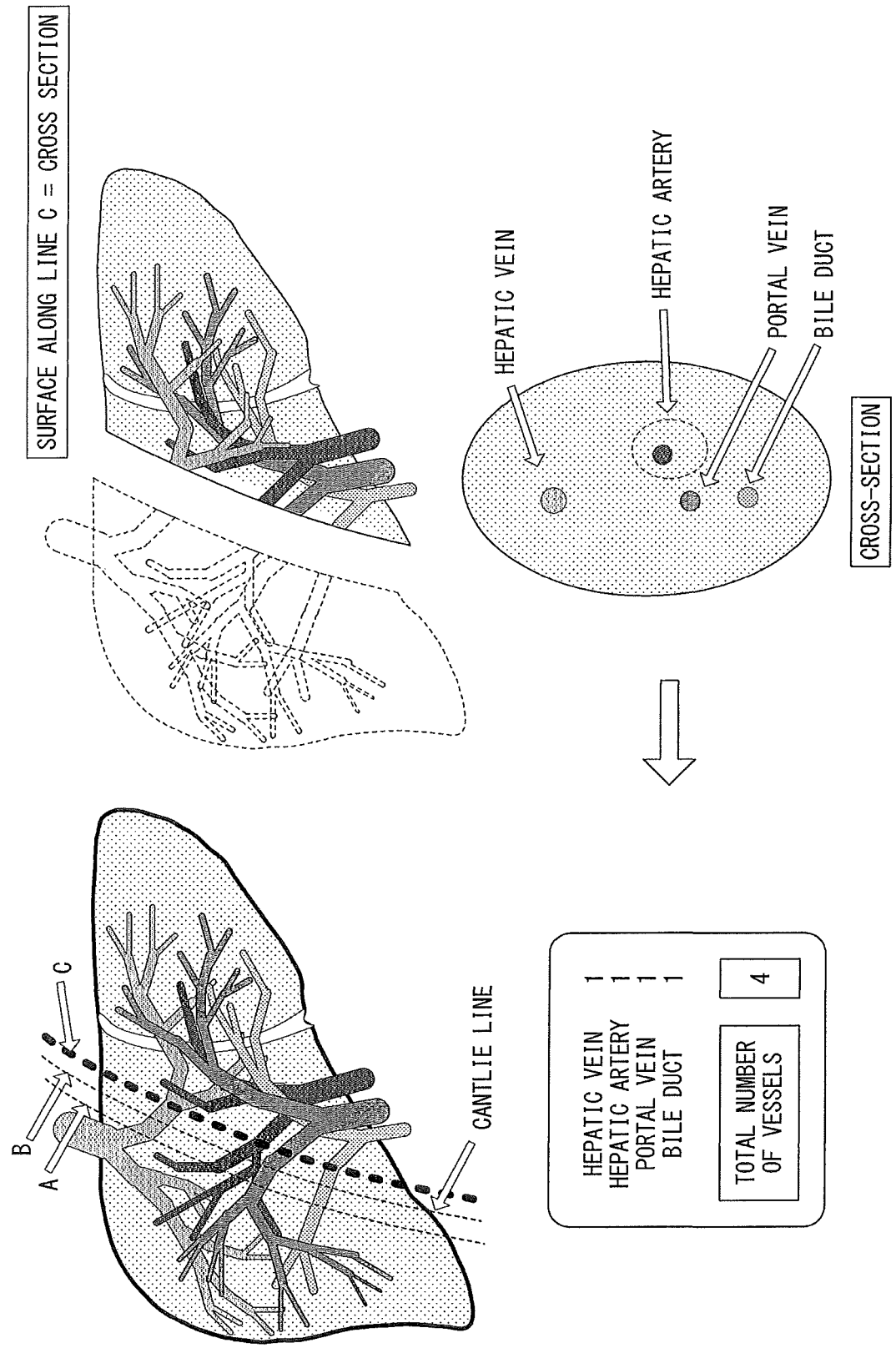
FIG. 7 is a third schematic diagram illustrating the concept of the cross section determination processing according to the first embodiment.

FIG. 4 is a flowchart illustrating the cross section determination processing according to the first embodiment. FIG. 5 to FIG. 7 are schematic diagrams illustrating the concept of the cross section determination processing according to the first embodiment. In the following, a description will be given of the case where the initial cross section is a cross-section along the Cantlie line.

As shown in FIG. 4, the processing of the step ST16 of the first embodiment is embodied by the steps ST100 to ST104.

In the step ST100, the initial cross section is set to the cross-section corresponding to the Cantlie line.

In the next step ST101, the number of vessels on the initial cross section is counted. Specifically, the three-dimensional image data of the liver is virtually resected at the initial cross section, and this virtually resected image is used for counting the number of vessels having a diameter larger than a predetermined value from among the hepatic vein, the hepatic artery, the portal vein, and the bile duct that are exposed on the initial cross section. Among the hepatic vein, the hepatic artery, the portal vein, and the bile duct that are exposed on the initial cross section, vessels with a diameter equal to or smaller than the predetermined value is/are not counted as the number of vessels.

In the next step ST102, a cross section is provisionally moved to a plurality of positions from the initial cross section within a predetermined range substantially parallel to the initial cross section. Cross sections moved to the plurality of positions are referred to as provisional cross sections.

In the next step ST103, the number of vessels is counted on each of the provisional cross sections in a manner similar to the step ST101. In detail, the three-dimensional image of the liver is virtually resected at each of the provisional cross sections, and resulting images of the provisional cross sections are used for counting the number of vessels having a diameter larger than the predetermined value from among the hepatic vein, the hepatic artery, the portal vein, and the bile duct that are exposed on each of the provisional cross sections.

In the next step ST104, the cross section with the smallest number of vessels among the plurality of provisional cross sections including the initial cross section is finally determined as the final cross section to be used in transplantation.

FIG. 5 to FIG. 7 are schematic diagrams for illustrating the concept of the cross section determination processing (i.e., steps ST100 to ST104) of the first embodiment described above.

FIG. 5 to FIG. 7 illustrate a case where it is determined in the step ST15 that the left lobe of the donor's liver is to be transplanted into the recipient.

The upper left part of FIG. 5 shows a case where the initial cross section is determined as the cross-section along the Cantlie line and the provisional cross sections are set on each of the right and left sides of the initial cross section so as to be substantially parallel to the initial cross section. In the upper left part of FIG. 5, the initial cross section is set as the cross-section along the central line B among the three lines A, B, and C, the left provisional cross section is set as the cross-section along the line A, and the right provisional cross section is set as the cross-section along the line C.

FIG. 5 shows a case where the number of vessels exposed on the provisional cross section along the line A is counted. The upper right part of FIG. 5 schematically illustrates the left lobe (i.e., the liver segment to be transplanted into the recipient) under the assumption that the liver is resected at the provisional cross section along the line A. The lower right part of FIG. 5 is a cross-sectional view schematically illustrating the provisional cross section along the line A. As shown in the lower right part of FIG. 5, on the provisional cross section along the line A, vessels having the predetermined diameter or more are depicted. All the vessels exposed on this provisional cross section and to be counted under the above-described condition are one hepatic vein, one portal vein, one bile duct, and three hepatic arteries. Thus, in the case of resecting the liver at this provisional cross section along the line A, a total of six vessels are exposed.

FIG. 6 shows a case where the number of vessels exposed on the initial cross section (i.e., cross section along the line B) is counted. The upper right part of FIG. 6 schematically illustrates the left lobe (i.e., the liver segment to be transplanted into the recipient) under the assumption that the liver is resected at the initial cross section along the line B. The lower right part of FIG. 6 is a cross-sectional view schematically illustrating the initial cross section along the line B. As shown in the lower right part of FIG. 6, on the initial cross section along the line B, vessels having the predetermined diameter or more are depicted. All the vessels exposed on the initial cross section and to be counted under the above-described condition are one hepatic vein, one portal vein, one bile duct, and two hepatic arteries. Thus, in the case of resecting the liver at the initial cross section along the line B, a total of five vessels are exposed.

FIG. 7 shows a case where the number of vessels exposed on the provisional cross section along the line C is counted. The upper right part of FIG. 7 schematically illustrates the left lobe (i.e., the liver segment to be transplanted into the recipient) under the assumption that the liver is resected at the provisional cross section along the line C. The lower right part of FIG. 7 is a cross-sectional view schematically illustrating the provisional cross section along the line C. As shown in the lower right part of FIG. 7, all the vessels exposed on this provisional cross section along the line C and to be counted under the above-described condition are one hepatic vein, one portal vein, one bile duct, and one hepatic artery.

Thus, in the case of resecting the liver at the provisional cross section along the line C, the total number of vessels to be exposed on the cross section is four and is the smallest among the three provisional cross sections (including the initial cross section) along the respective lines A, B, and C. Consequently, in the step ST104 of FIG. 4, the provisional cross section along the line C is finally determined as the cross section to be used in transplantation.

In the step ST17 of FIG. 4 (or FIG. 3), the determined cross section and the three-dimensional image of the liver virtually resected at the determined cross section are displayed on the display 15 and used for confirmation by doctors.

When the number of vessels exposed on the cross section is large, for example, when the number of hepatic arteries exposed on the cross section is two or three as described above, two or three hepatic arteries of the liver segment to be transplanted must be anastomosed to one hepatic artery on the recipient side and this takes longer time for the anastomosis at the time of transplantation.

However, according to the medical image processing apparatus 1 of the first embodiment, the cross section to be used in actual transplantation is finally determined such that the number of vessels exposed on the cross section is minimized. Thus, the time required for the vascular anastomosis during transplantation is shortened.

Second Embodiment

Figure 8:
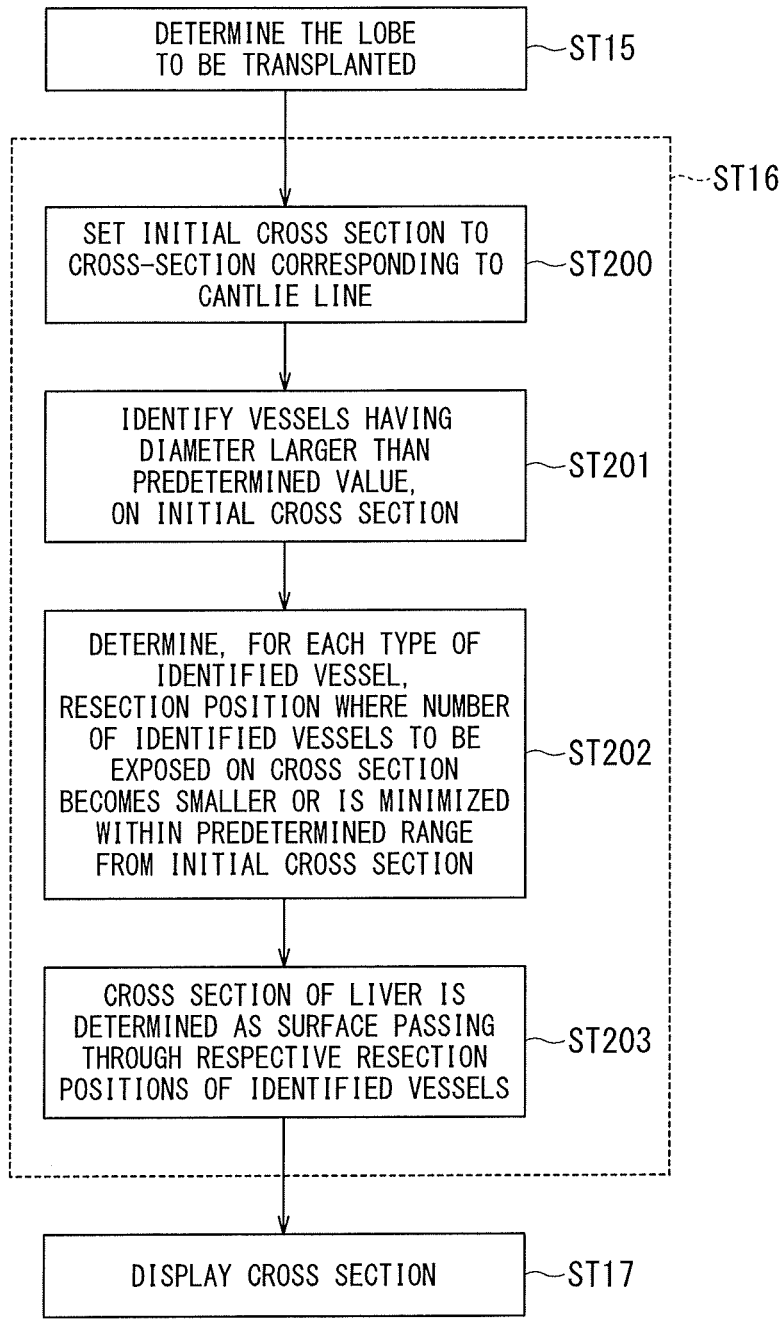
FIG. 8 is a flowchart illustrating the cross section determination processing according to the second embodiment.
Figure 9:
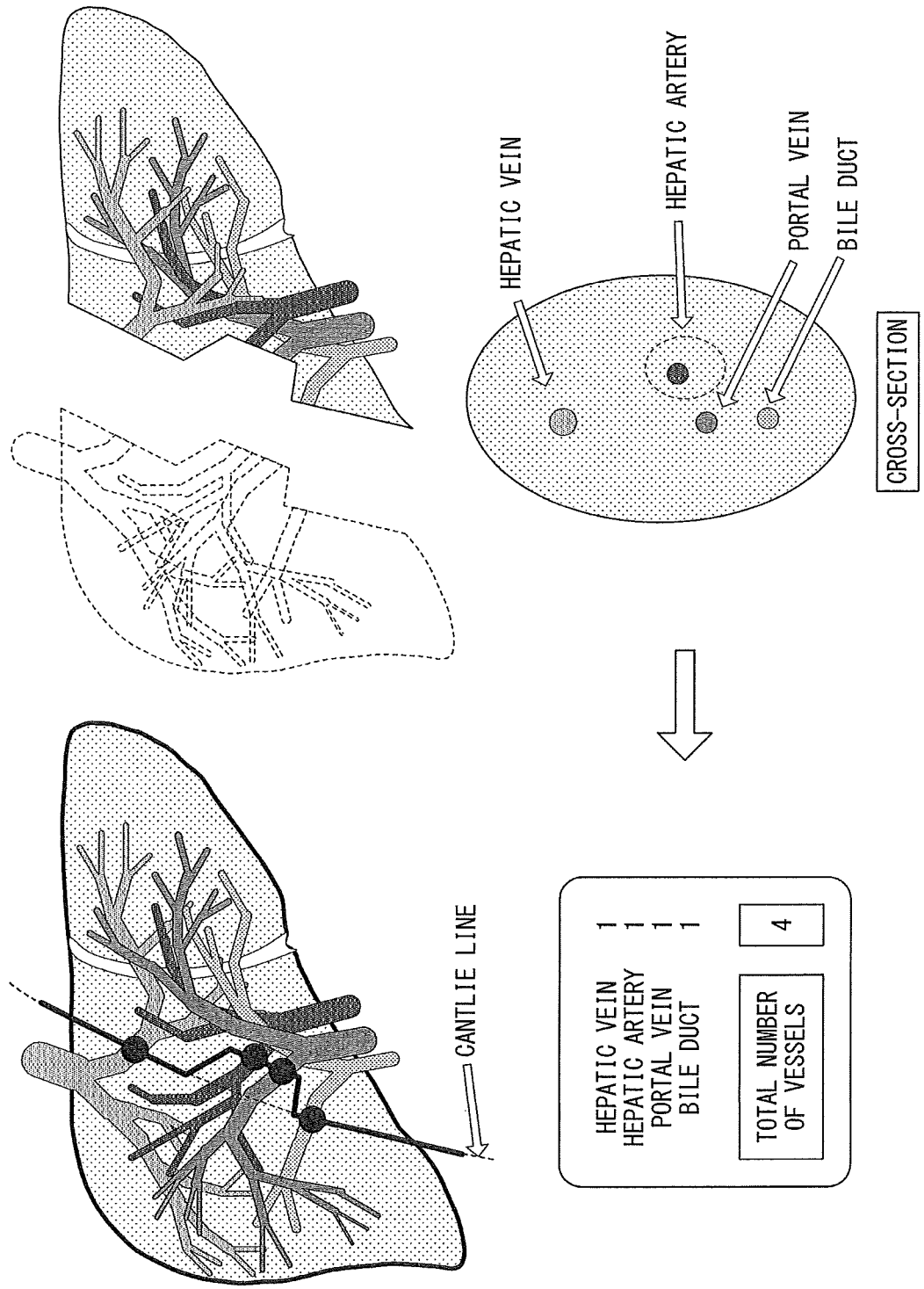
FIG. 9 is a schematic diagram illustrating the concept of the cross section determination processing according to the second embodiment.

FIG. 8 is a flowchart illustrating the cross section determination processing according to the second embodiment. FIG. 9 is a schematic diagram illustrating the concept of the cross section determination processing according to the second embodiment.

The processing of the steps ST200 and ST201 in FIG. 8 is substantially the same as the processing of the steps ST100 and ST101 in the first embodiment. In more detail, in the step ST200, the initial cross section is set to the cross-section along the Cantlie line. In the next step ST201, vessels having a diameter larger than the predetermined diameter are identified (or extracted) on the initial cross section.

The processing in the next steps ST202 and ST203 is different from the processing in the first embodiment. In the step ST202, the processing circuitry 10 determines a resection position for each of the identified types of vessels where the number of the identified type of vessels to be exposed on the cross section is minimized (preferably, minimized to one) within a predetermined range from the initial cross section.

In the next step ST203, the cross section of the liver to be transplanted is determined so as to pass through the determined respective resection positions for each of the identified types of vessels.

The upper left part of FIG. 9 is a schematic diagram illustrating the concept of the processing in the steps ST202 and ST203. As shown in the upper left part of FIG. 9, the hepatic vein, the hepatic artery, the portal vein, and the bile duct are identified in order from the top in the vicinity of the initial cross section (i.e., cross-section along the Cantlie line). In the upper left part of FIG. 9, each black circle indicates, for each type of identified vessel, the resection position where the number of vessels is the smallest (specifically, minimized to one) within the predetermined range from the initial cross section.

The upper left part of FIG. 9 shows the cross section of the liver to be finally determined in the step ST203, and this determined cross section passes through the positions of the black circles of the respective vessels and corresponds to the polygonal line indicated by the thick solid line (i.e., the cross section having a groove-shaped recess at the center).

The upper right part of FIG. 9 schematically shows the left lobe (i.e., the liver segment to be transplanted into the recipient) under the assumption that the liver is resected at the cross section (i.e., surface having the groove-shaped recess at the center) determined in the step ST203. As shown in the lower right part of FIG. 9, for each type of identified vessel including the hepatic vein, the hepatic artery, the portal vein, and the bile duct, only one vessel is exposed on the determined cross section of the liver.

Thus, the total number of vessels exposed on the cross section to be determined in the step ST203 of the second embodiment is four, similarly to the first embodiment. According to the second embodiment described above, the cross section of the liver can be determined such that the number of vessels exposed on the cross section can be minimized, and the time required for anastomosis during transplantation can be shortened.

Modification of Second Embodiment

In the second embodiment described above, for each type of identified vessel, the processing circuitry 10 determines a resection position where the number of vessels to be exposed on the cross section is minimized or preferably reduced to one within the predetermined range from the initial cross section.

In the modification of the second embodiment, the processing circuitry 10 determines a resection position for each type of identified vessel such that the following first and second conditions are satisfied. The first condition is that the number of vessels to be exposed on the cross section is minimized, preferably reduced to one. The second condition is for the case where a vascular bifurcation exists within the predetermined range from the initial cross section, and the second condition is that the resection position of each vessel is separated away from the vascular bifurcation by a predetermined distance.

The processing of determining the cross section of the liver on the basis of the resection positions of vessels to be obtained under the above-described conditions (i.e., the processing of the step ST203 in FIG. 8) is the same as the processing in the second embodiment.

It is generally said that anastomosis of vessels resected near a vascular bifurcation is more difficult because the vessels resected near the vascular bifurcation are more complicated in terms of cross-sectional shape of the vessels than vessels resected at a position away from the vascular bifurcation. In the modification of the second embodiment, resection in the vicinity of the vascular bifurcation can be avoided and such a problem can be avoided. Note that the second condition added in the modification of the second embodiment may be added to the first embodiment. In other words, the processing circuitry 10 of the first embodiment may determine the cross section such that resection position of each vessel is separated away from the vascular bifurcation by the predetermined distance when the vascular bifurcation exists within the predetermined range from the initial cross section.

Third Embodiment

Figure 10:
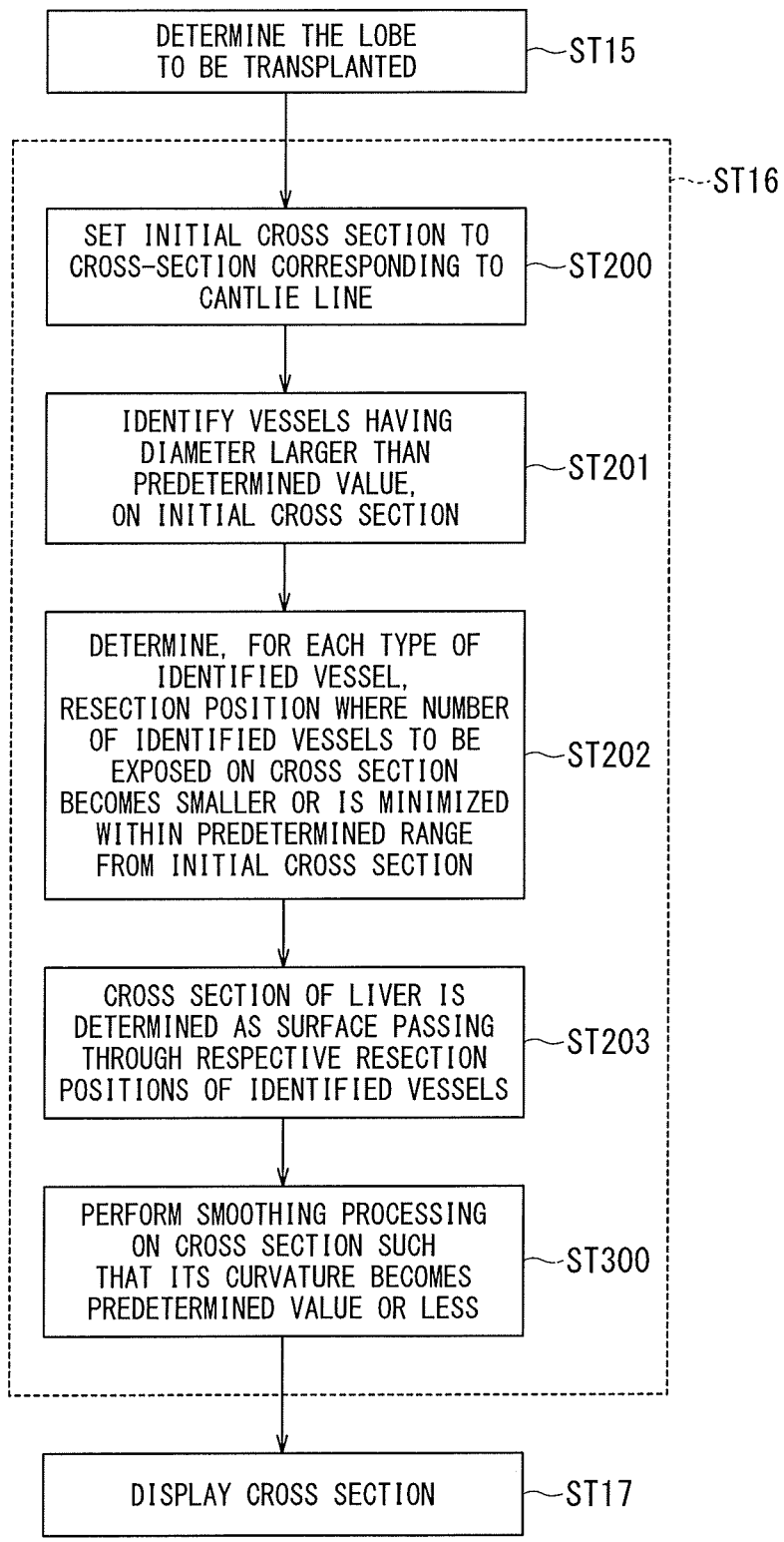
FIG. 10 is a flowchart illustrating the cross section determination processing according to the third embodiment.
Figure 11:
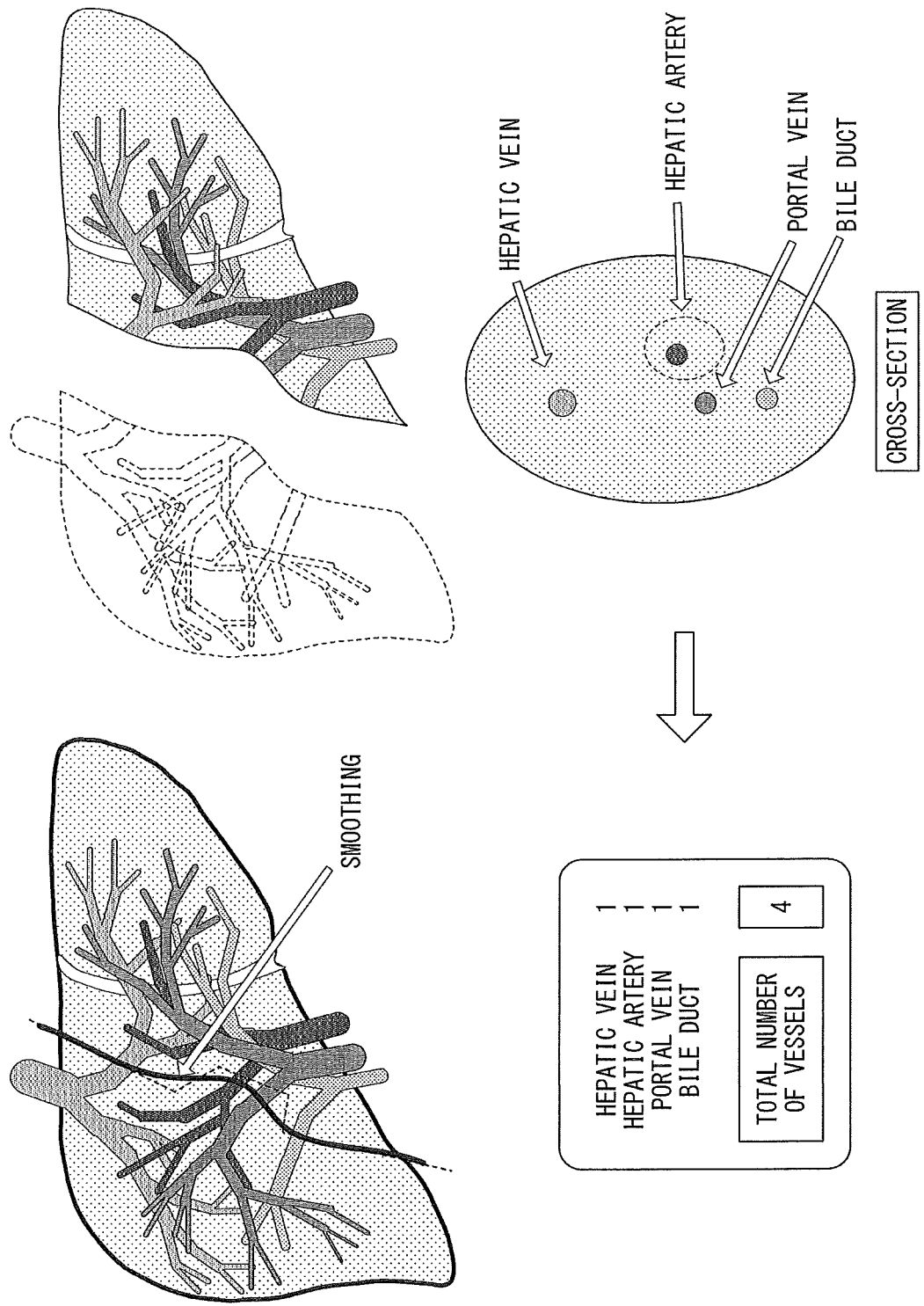
FIG. 11 is a schematic diagram illustrating the concept of the cross section determination processing according to the third embodiment.

FIG. 10 is a flowchart illustrating the cross section determination processing according to the third embodiment. FIG. 11 is a schematic diagram illustrating the concept of the cross section determination processing according to the third embodiment.

The processing from the steps ST200 to ST203 in FIG. 10 is the same as that in the second embodiment. In the third embodiment, the processing of the step ST300 is added subsequent to the step ST203.

Specifically, in the step ST300, smoothing processing is performed on the cross section determined in the step ST203 such that the cross section determined in the step ST203 is converted into a smooth surface. In the step ST300, regardless of whether the cross section before the smoothing processing is a curved surface or non-curved surface, the smoothing processing is performed such that the curvature of the cross section after the smoothing processing becomes a predetermined value or less, for example.

The upper left part of FIG. 11 is for illustrating the concept of the processing in the step ST300 of the third embodiment. As shown in the upper left part of FIG. 11, when the shape of the cross section before the smoothing processing is a surface corresponding to a polygonal line indicated by the thin broken line (i.e., surface having a groove-shaped recess in the center), this cross section is subjected to the smoothing processing of the step ST300 so as to become a smooth cross section having a predetermined curvature or less as shown by the thick solid line.

The upper right part of FIG. 11 schematically illustrates the left lobe (i.e., the liver segment to be transplanted into the recipient) under the assumption that the liver is resected at the cross section determined in the step ST300 (i.e., at the cross section subjected to the smoothing processing). Also, in the third embodiment, for each type of identified vessel including the hepatic vein, the hepatic artery, the portal vein, and the bile duct, only one vessel is exposed on the determined cross section of the liver as shown in the lower right part of FIG. 11 similarly to the second embodiment.

According to the third embodiment described above, the total number of vessels exposed on the cross section is four similarly to the first and second embodiments, and the cross section of the liver to be transplanted is determined such that the number of vessels exposed on the cross section is minimized. Since the cross section is smoothed so as to have a predetermined curvature or less in the third embodiment, the work of doctors who resect the liver segment from the donor becomes easier, and thus overall time required for transplantation is expected to be shortened.

Fourth Embodiment

In each embodiment described above, the medical image processing apparatus 1 can cause the display 15 to display the three-dimensional images (or the determined cross section) of the liver to be resected at the cross section determined according to each embodiment. Doctors observe these images determined by the medical image processing apparatus 1 and determine the validity or appropriateness of the cross section.

In the fourth embodiment, a plurality of embodiments, for example, the above-described first to third embodiments are performed simultaneously or time-sequentially, and the three-dimensional images of the liver virtually resected at the cross sections obtained by the respective embodiment are displayed on the display 15 in parallel or time-sequentially as choices of the cross section to be selected in the actual transplantation. In addition, the number of vascular anastomoses may be displayed on display 15 together with the three-dimensional images.

FIG. 12 is a schematic diagram illustrating a display screen W1 that appears on the display 15 in the fourth embodiment. In the case shown in FIG. 12, three-dimensional images of the liver virtually resected at the respective cross sections determined in the first to third embodiments are displayed in parallel from the left. Below the three-dimensional images of each liver, the display 15 also displays the number of vascular anastomoses in the case of resecting the liver at this cross section and transplanting it into the recipient.

Since the number of anastomoses is four and the same for all the three choices of the cross section in this case, doctors observe the displayed three-dimensional images of the liver and comprehensively evaluate, for example, the shape of each choice of the cross section and the running situation of each vessel near the cross section. After this evaluation, doctors designate a desired choice of the cross section by, for example, attaching a check mark to a selection window provided above the desired image. The cross section determination function 103 of the medical image processing apparatus 1 finally determines the cross section of the liver to be used in the actual transplantation in accordance with this designation by the doctors.

According to at least one embodiment described above, the cross section of the donor's liver in living-donor liver transplantation can be efficiently determined in a short time.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A medical image processing apparatus comprising:
    processing circuitry configured to
        acquire three-dimensional image data including a liver of a donor,
        extract a region of the liver and vessels in the liver from the three-dimensional image data, and
        determine, in the extracted region of the liver, a cross section of the liver in such a manner that volume of the liver to be resected from the donor satisfies a predetermined matching condition of transplantation and number of vessels on the cross section becomes smaller.

2. The medical image processing apparatus according to claim 1, wherein the processing circuitry is configured to
    further set an initial cross section of the liver, and
    determine the cross section of the liver by adjusting at least one of a position and shape of the initial cross section.

3. The medical image processing apparatus according to claim 2, wherein the processing circuitry is configured to set the initial cross section as a cross-section corresponding to a Cantlie line or hepatic falciform ligament.

4. The medical image processing apparatus according to claim 2, wherein the processing circuitry is configured to
    set a plurality of provisional cross sections in parallel to the initial cross section within a predetermined range from the initial cross section, and
    determine the cross section of the liver by selecting one of the plurality of provisional cross sections in such a manner that number of vessels becomes smaller.

5. The medical image processing apparatus according to claim 2, wherein the processing circuitry is configured to
    determine resection positions of vessels where number of the vessels becomes smaller within a predetermined range from the initial cross section, for respective vessels, and
    determine the cross section of the liver as a surface that passes through the respective resection positions.

6. The medical image processing apparatus according to claim 5, wherein the processing circuitry is configured to determine the cross section of the liver in such a manner that curvature of the cross section of the liver becomes a predetermined value or less.

7. The medical image processing apparatus according to claim 1, wherein:
    the vessels on the cross section are vessels to be anastomosed with vessels of a recipient at a time of transplantation; and
    the processing circuitry is configured to determine the cross section of the liver in such a manner that number of the vessels existing on the cross section and having a diameter larger than a predetermined value becomes the smallest.

8. The medical image processing apparatus according to claim 1, wherein the processing circuitry is configured to count number of the vessels on the cross section in such a manner that each peripheral vessel on the cross section and each vessel having a diameter equal to or smaller than a predetermined value on the cross section are excluded.

9. The medical image processing apparatus according to claim 1, wherein the processing circuitry is configured to determine the cross section in such a manner that a bifurcation of each vessel is separated away from the cross section by a predetermined distance.

10. The medical image processing apparatus according to claim 1, further comprising a display, wherein the processing circuitry is configured to
    provisionally determine a plurality of choices of the cross section,
    causing the display to display the plurality of choices of the cross section, and
    finally determine the cross section as a cross section designated from among the plurality of choices of the cross section displayed on the display.

11. The medical image processing apparatus according to claim 1, wherein the three-dimensional image data are data generated by imaging the donor with an X-ray CT apparatus.

12. A medical image processing method comprising:
    acquiring three-dimensional image data including a liver of a donor,
    extract a region of the liver and vessels in the liver from the three-dimensional image data, and
    determine a cross section in the region of the liver in such a manner that volume of the liver to be resected from the donor satisfies a predetermined matching condition of transplantation and number of vessels on the cross section becomes smaller.

13. A non-transitory computer readable medium that stores a program causing a computer to execute a process for
    acquiring three-dimensional image data including a liver of a donor,
    extracting a region of the liver and vessels in the liver from the three-dimensional image data, and
    determining, in the extracted region of the liver, a cross section of the liver in such a manner that volume of the liver to be resected from the donor satisfies a predetermined matching condition of transplantation and number of vessels on the cross section becomes smaller.

* * * * *